United States Patent
Vauhkonen et al.

(10) Patent No.: US 10,414,992 B2
(45) Date of Patent: *Sep. 17, 2019

(54) FUEL COMPOSITION

(71) Applicant: UPM-KYMMENE CORPORATION, Helsinki (FI)

(72) Inventors: Ville Vauhkonen, Joutseno (FI); Jaakko Nousiainen, Lappeenranta (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 16 days.

This patent is subject to a terminal disclaimer.

(21) Appl. No.: 15/514,970

(22) PCT Filed: Oct. 1, 2015

(86) PCT No.: PCT/FI2015/050650
§ 371 (c)(1),
(2) Date: Mar. 28, 2017

(87) PCT Pub. No.: WO2016/051017
PCT Pub. Date: Apr. 7, 2016

(65) Prior Publication Data
US 2017/0218288 A1    Aug. 3, 2017

(30) Foreign Application Priority Data

Oct. 1, 2014 (FI) ..................... 20145854

(51) Int. Cl.
*C10L 1/02* (2006.01)
*C10G 3/00* (2006.01)

(52) U.S. Cl.
CPC ............ *C10L 1/02* (2013.01); *C10G 3/00* (2013.01); *C10G 3/42* (2013.01); *C10G 3/50* (2013.01); *C10L 1/023* (2013.01); *C10G 2300/1014* (2013.01); *C10G 2300/301* (2013.01); *C10G 2300/305* (2013.01); *Y02P 30/20* (2015.11)

(58) Field of Classification Search
CPC ............ C10L 1/02; Y02P 30/20; Y02P 30/42
See application file for complete search history.

(56) References Cited

U.S. PATENT DOCUMENTS 4,036,741 A    7/1977   Pollitzer et al.
9,885,000 B2 *  2/2018  Nousiainen ............ C10L 1/023
(Continued)

FOREIGN PATENT DOCUMENTS

WO    2007142475 A1    12/2007
WO    2011053650 A2    5/2011

OTHER PUBLICATIONS

Search Report from the Swedish Patent and Registration Office for Swedish Application No. 1750388-9; Search Report Completed: Jan. 25, 2018; dated Jan. 26, 2018; 3 Pages.

(Continued)

*Primary Examiner* — Ellen M McAvoy
*Assistant Examiner* — Ming Cheung Po
(74) *Attorney, Agent, or Firm* — Cantor Colburn LLP

(57) ABSTRACT

The present invention relates to a gasoline composition comprising a) 70-86% by volume of ethanol, b) a hydrocarbon component comprising hydrocarbons derived from feedstock comprising tall oil material, where said hydrocarbon component has RON of 50-70 and it comprises 25-60 mass % of naphthenes.

30 Claims, 2 Drawing Sheets

(56) References Cited

U.S. PATENT DOCUMENTS

| | | | |
|---|---|---|---|
| 2004/0107634 A1* | 6/2004 | Binions | C10L 1/023 |
| | | | 44/359 |
| 2007/0204505 A1 | 9/2007 | Abou-Nemeh | |
| 2007/0256354 A1 | 11/2007 | Gibbs | |
| 2008/0302001 A1 | 12/2008 | Koivusalmi et al. | |
| 2009/0193711 A1 | 8/2009 | Clark et al. | |
| 2009/0294324 A1 | 12/2009 | Brandvold et al. | |
| 2010/0058648 A1 | 3/2010 | Marker et al. | |
| 2010/0175313 A1 | 7/2010 | Mattingly et al. | |
| 2011/0015459 A1 | 1/2011 | Aalto et al. | |
| 2011/0319683 A1* | 12/2011 | Abhari | C10G 3/50 |
| | | | 585/16 |
| 2012/0260565 A1 | 10/2012 | Nousiainen et al. | |
| 2013/0067801 A1 | 3/2013 | Nousiainen et al. | |
| 2013/0144090 A1 | 6/2013 | Pansare et al. | |
| 2013/0237728 A1 | 9/2013 | Lotero et al. | |
| 2015/0159100 A1* | 6/2015 | Shi | C10L 1/08 |
| | | | 585/14 |

OTHER PUBLICATIONS

Finnish Patent and Registration Office Search Report for Patent Application No. 20145854; dated Jun. 2, 2015; 2 Pages.
International Search Report for International Application No. PCT/FI2015050650; Date of Completion: Jan. 4, 2016; dated Jan. 20, 2016; 3 Pages.
Written Opinion of the International Searching Authority for International Application No. PCT/FI2015/050650; Date of Completion: Jan. 4, 2016; dated Jan. 20, 2016; 5 Pages.

* cited by examiner

FUEL COMPOSITION

CROSS-REFERENCE TO RELATED APPLICATIONS

This application is a National Stage application of PCT/FI2015/050650, filed Oct. 1, 2015, which claims the benefit of Finland Application No. 20145854, filed Oct. 1, 2014, both of which are incorporated by reference herein in their entirety.

FIELD OF THE INVENTION

The present invention relates to biofuels and particularly to fuel compositions suitable as transportation fuel. More particularly the invention relates to fuel compositions comprising ethanol and a hydrocarbon component comprising hydrocarbons derived from feedstock comprising tall oil material.

BACKGROUND OF THE INVENTION

Biofuels comprising hydrocarbons derived from feedstock originating from renewable sources, including oils and fats originating from plants, animals, algae, fish, microbiological processes, various waste streams and sewage sludge, are used in increasing amounts as alternatives for fossil fuels or as blending stocks for fuels. The feedstock may be hydroprocessed in one or more steps to yield hydrocarbons, which further can be fractionated to liquid fuel cuts, such as diesel, gasoline, etc.

Ethanol is another widely used liquid biofuel. It is readily available by fermentation of sugar-containing feeds using yeast, however there are also alternative processes available, such as biomass gasification followed by alcohol synthesis, or gasification followed by fermentation using anaerobic bacteria.

The use of ethanol in conventional gasoline cars is usually limited to 10-15% by volume due to technical limitations of the engines. In the gasoline pool of fuels only ethanol is generally approved as blending component. 95E10, 98E5 and E85 gasoline products contain ethanol in combination with fossil fuel blending components, and further, E100 (100% ethanol) is sold in Brazil. In countries at warm climates the vapor pressure causes no problems. However, under cold climate where the temperature may be 0° C. or lower, the ethanol fuel does not meet the official fuel requirements, particularly regarding vapor pressure.

In general the conventional spark-ignited engines are not compatible with fuels having higher oxygen content. Fuels having higher ethanol blending ratios can be used in engines capable of using high ethanol fuels, such as vehicles based on Flexible Fuel Vehicle technology (FFV), and any proportion of ethanol can be used in gasoline blends. Gasoline blends containing high amounts of ethanol typically have low vapor pressure and the combustion event and idling performance may not be acceptable. Generally E85 gasoline blends shall meet the national or international standards.

Despite the ongoing research and development of liquid fuels, there is a need to provide improved biofuel compositions based on high ethanol content, useful as gasoline.

SUMMARY OF THE INVENTION

An object of the present invention is to provide a fuel composition comprising ethanol and a hydrocarbon component derived from renewable sources.

Another object of the invention is to provide a fuel composition based on at least 90 wt % of renewable materials and comprising ethanol and hydrocarbons derived from feedstock comprising tall oil material, where said composition has improved performance.

The present invention is based on the findings that a specific combination of hydrocarbons derived from feedstock comprising tall oil material and ethanol provides a fuel composition meeting the international standards for E85 fuel and surprisingly it has improved combustion properties, combustion stability, and improved idling properties.

More specifically the present invention is directed to a fuel composition, which comprises a) 70-86% by volume of ethanol, b) 5-20% by volume of a hydrocarbon component comprising hydrocarbons derived from feedstock comprising tall oil material, where said hydrocarbon component has RON of 50-70 and said hydrocarbon component comprises 25-60 mass % of naphthenes.

The present invention also relates to the use of the fuel composition as E85 fuel for use in engines capable of using high ethanol fuels, such as engines based on Flexible Fuel Vehicle technology (FFV) and the like.

The present invention also relates to a fuel composition, which comprises a) 70-86% by volume of ethanol, b) 5-20% by volume of a hydrocarbon component comprising hydrocarbons derived from feedstock comprising tall oil material, where said hydrocarbon component has RON of 50-70, and said hydrocarbon comprises 25-60 mass % of naphthenes, where the hydrocarbon component is obtainable by a method comprising the step of hydroprocessing feedstock comprising tall oil material in the presence of at least one hydroprocessing catalyst and fractionating the hydroprocessed product.

The present invention also relates to a method for the manufacture of a fuel composition, said method comprising the steps of blending 70-86% by volume of ethanol, and 5-20% by volume of a hydrocarbon component comprising hydrocarbons derived from feedstock comprising tall oil material where said hydrocarbon component has RON of 50-70, and it comprises 25-60 mass % of naphthenes.

According to one embodiment the present invention further relates to a fuel composition based on at least 90% by volume of renewable materials, where at least the hydrocarbons and ethanol are derived from renewable materials.

Characteristic features of the invention are presented in the appended claims.

DEFINITIONS

The term "gasoline", known also as "gas" and "petrol" refers here to fractions or cuts or blends of hydrocarbons used as a fuel in internal combustion engines. Gasoline may also comprise ethanol.

The term "naphtha" refers to a liquid hydrocarbon fraction distilled between the light gaseous components and heavier kerosene fraction. Naphtha typically contains a mixture of hydrocarbons (linear alkanes, branched alkanes, cycloalkanes and aromatic hydrocarbons) having a boiling point between about 30° C. and about 200° C.

The term "hydrocarbon component" refers here to a liquid hydrocarbon fraction obtained from hydroprocessing feedstock comprising tall oil material in the presence of at least one hydroprocessing catalyst and fractionating the hydroprocessed product.

Spark ignition engines are designed to burn gasoline in a controlled process. In some case, the unburned mixture can auto-ignite, which causes rapid pressure rise which can damage the engine. This phenomenom is often called engine knocking. One way to reduce knock in spark engines is to increase the gasoline's resistance to auto-ignition, which is expressed as octane rating. Octane rating is measured relative to a mixture of 2,2,4.trimethylpentane and n-heptane. Two commonly used octane numbers are research octane number (RON) and motor octane number (MON). RON for commercially available gasoline varies by country. In Finland, Sweden and Norway, 95 RON is the standard for unleaded gasoline.

The term "naphthene" refers to cyclic aliphatic hydrocarbons having the chemical formula of $C_nH2_n$ and having one or more rings.

The term "hydroprocessing" refers here to catalytic processing of feedstock originating from renewable sources by all means of molecular hydrogen.

Said hydroprocessing includes a catalytic process, which removes oxygen from organic oxygen compounds as water (hydrodeoxygenation, HDO), sulfur from organic sulfur compounds as dihydrogen sulfide (hydrodesulfurisation, HDS), nitrogen from organic nitrogen compounds as ammonia (hydrodenitrogenation, HDN), halogens, for example chlorine from organic chloride compounds as hydrochloric acid (hydrodechlorination, HDCI), by the means of molecular hydrogen. Said hydroprocessing also includes hydrogenation, which means here saturation of carbon-carbon double bonds by means of molecular hydrogen under the influence of a catalyst, hydrocracking, which refers to catalytic decomposition of organic hydrocarbon materials using molecular hydrogen at high pressures, and hydrodewaxing (HDW), which refers to catalytic treatment of organic hydrocarbon materials using molecular hydrogen at high pressures to reduce the wax and/or the content of high carbon number hydrocarbons by isomerization and/or cracking. Also ring opening reactions and saturation of aromatic compounds may take place. Said hydroprocessing also includes hydrodearomatization (HDA), which refers to catalytic treatment of organic hydrocarbon materials using molecular hydrogen at high pressures for converting aromatic compound to non-aromatic compounds.

Transportation fuels refer to, such as for diesel fuel (middle distillate from 160 to 380° C., EN 590), gasoline, aviation fuel (160 to 300° C., ASTM D-1655 jet fuel), kerosene, naphtha, etc.

Liquid fuels refer here to hydrocarbons having distillation curves standardized for fuels and also to fuel compositions comprising ethanol, meeting international standards.

DETAILED DESCRIPTION OF THE INVENTION

Figure 1:
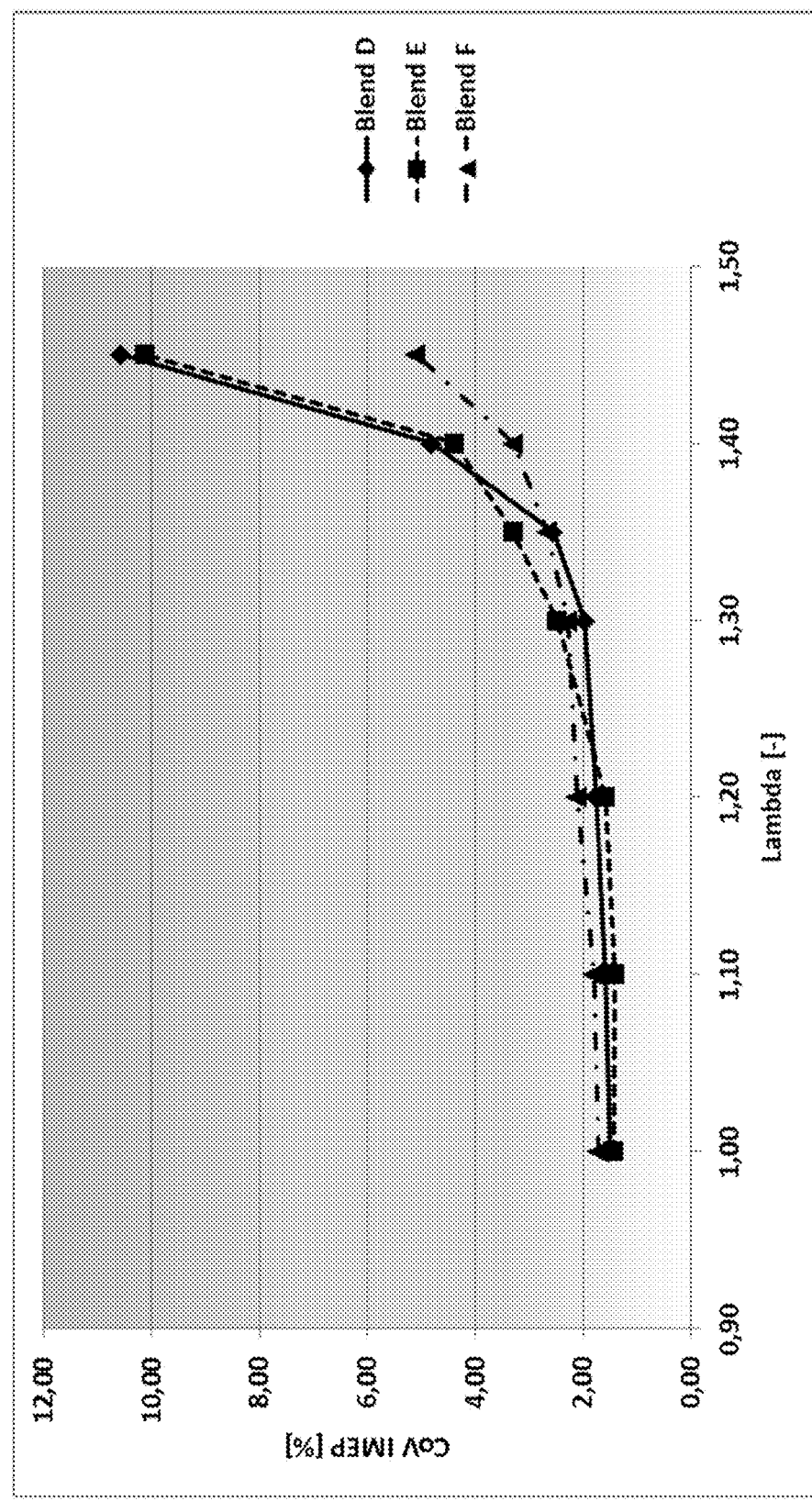
FIG. 1 shows lean excursion test performed to judge the combustion stability, presented as covariance [CoV] of IMEP as a function of lambda.

It was surprisingly found that several advantageous effects may be achieved with a fuel composition comprising ethanol and a hydrocarbon component, where said hydrocarbon component comprises hydrocarbons derived from feedstock comprising tall oil material. The fuel composition provides stable and consistent combustion. it also has improved idling properties, improved lean stability. Further, the fuel consumption is at least the same of even less when compared with commercially available E85 fuel and there are no differences in raw emissions. Further, no pre-ignition events could be detected with the new fuel composition.

The hydrocarbon component comprising hydrocarbons derived from feedstock comprising tall oil material has a unique composition particularly when compared with hydrocarbon components used in commercial E85 fuels. It has high naphthene content. It also has very low aromatics content and optimal ratio of i-paraffins to n-paraffins. The hydrocarbon component surprisingly provides the advantageous effects when blended with ethanol and optional additives.

The fuel composition of the invention is a blend comprising said hydrocarbon component and ethanol, and it meets the international standards for E85 fuel. Thus it can be conveniently used in all engines capable of using high ethanol fuels.

Fuel Composition

In an embodiment the fuel composition comprises a) 70-86% by volume of ethanol, and b) 5-20% by volume of a hydrocarbon component comprising hydrocarbons derived from feedstock comprising tall oil material, where said hydrocarbon component has RON of 50-70, and said hydrocarbon component comprises 25-60 mass % of naphthenes.

In another embodiment the fuel composition comprises a) 70-86% by volume of ethanol, and b) 5-20% by volume of a hydrocarbon component comprising hydrocarbons derived from feedstock comprising tall oil material, where said hydrocarbon component has RON of 50-70, and said hydrocarbon component comprises 25-60 mass % of naphthenes, and where the hydrocarbon component is obtainable by a method comprising the step of hydroprocessing feedstock comprising tall oil material in the presence of at least one hydroprocessing catalyst and fractionating the hydroprocessed product.

The fuel composition meeting international standards for E85 fuels has improved combustion properties, improved combustion stability, and improved idling properties, no pre-ignition events and high vapor pressure, particularly when compared with commercial E85 fuels.

Ethanol

According to an embodiment the fuel composition comprises 70-86% by volume of ethanol. Suitably the ethanol is derived from renewable materials, obtainable using methods known as such. The ethanol has ethanol content of at least 95% by volume, suitably 98-100% by volume.

Hydrocarbon Component

The hydrocarbon component comprises 8-30 mass % of $C_{4-12}$ linear alkanes. Linear alkanes refer here to n-paraffins. The content of $C_{4-12}$ linear alkanes is suitably 10-20 mass %, more suitably 12-18 mass %. The linear alkanes are suitably $C_{5-10}$ linear alkanes, more suitably $C_{5-9}$ linear alkanes, even more suitably $C_{6-8}$ linear alkanes i.e. the hydrocarbon component comprises suitably 8-30 mass % of $C_{5-10}$ linear alkanes, more suitably 8-30 mass % of $C_{5-9}$ linear alkanes, even more suitably 8-30 mass % of $C_{6-8}$ linear alkanes.

In one embodiment, the hydrocarbon component contains 10-20 mass % of $C_{4-12}$ linear alkanes. In another embodiment the hydrocarbon component contains 10-20 mass % of $C_{5-10}$ linear alkanes. In another embodiment the hydrocarbon component contains 10-20 mass % of $C_{5-9}$ linear alkanes. In a further embodiment the hydrocarbon component contains 12-18 mass % of $C_{5-10}$ linear alkanes. In a still further embodiment the hydrocarbon component contains 12-18 mass % of $C_{5-9}$ linear alkanes.

The hydrocarbon component comprises 5-50 mass % of $C_{4-12}$ branched alkanes. Branched alkanes refer here to i-paraffins. The content of $C_{4-12}$ branched alkanes is suitably 20-40 mass %, more suitably 30-40 mass %. The branched alkanes are suitably $C_{5-11}$ branched alkanes, more suitably $C_{5-10}$ branched alkanes, even more suitably $C_{6-8}$ branched alkanes.

In one embodiment, the hydrocarbon component contains 20-40 mass % of the branched alkanes. In another embodiment the hydrocarbon component contains 20-40 mass % of $C_{5-11}$ branched alkanes. In a further embodiment the hydrocarbon component contains 20-40 mass % of $C_{5-10}$ branched alkanes. In a still further embodiment the hydrocarbon component contains 30-40 mass % of $C_{5-11}$ branched alkanes. In a still further embodiment the hydrocarbon component contains 30-40 mass % of $C_{5-10}$ branched alkanes.

The hydrocarbon component comprises 25-60 mass % of naphthenes. Naphthenes refer here to cycloalkanes. The content of naphthenes is suitably 30-50 mass %, more suitably 35-45 mass %. The naphthenes are $C_{5-12}$ cycloalkanes, suitably $C_{5-10}$ cycloalkanes, more suitably $C_{6-10}$ cycloalkanes, more suitably $C_{6-9}$ cycloalkanes.

In one embodiment, the hydrocarbon component contains 30-50 mass % of $C_{6-10}$ cycloalkanes. In another embodiment, the hydrocarbon component contains 30-50 mass % of $C_{6-9}$ cycloalkanes. In a further embodiment, the hydrocarbon component contains 35-45 mass % of $C_{6-10}$ cycloalkanes. In a still further embodiment, the hydrocarbon component contains 35-45 mass % of $C_{6-9}$ cycloalkanes.

The hydrocarbon component comprises 0.1-25 mass % of $C_{6-12}$ aromatic hydrocarbons. The content of $C_{6-12}$ aromatic hydrocarbons is suitably 0.1-10 mass %. The aromatic hydrocarbons are suitably $C_{6-10}$ aromatic hydrocarbons. The carbon numbers denote the total number of carbon atoms contained in the aromatic hydrocarbons, including the carbon atoms contained in non-aromatic constituents (e.g. alkyl substituents of an aromatic ring). Examples of the aromatic hydrocarbons include ethylbenzene, xylenes, butyl benzene and ethyl butyl benzene.

The total amount of $C_{4-12}$ alkanes in the hydrocarbon component is 40-70 mass %, suitably 40-60 mass %. "Alkanes" covers both linear and branched alkanes.

The hydrocarbon component comprises suitably at least 80 mass %, more suitably at least 85 mass %, still more suitable at least 90 mass %, and most suitably 90-95 mass %, in total, of C4-12 alkanes and C5-12 cycloalkanes.

The hydrocarbon component contains no more than 5 mass % of other hydrocarbons. In particular, the hydrocarbon component contains no more than 1 mass % of alkenes. Such a low alkene content can be achieved using the hydroprocessing method disclosed in this specification. A low alkene content is beneficial in terms of the oxidation stability of the fuel composition.

The hydrocarbon component contains no more than 0.5 mass % in total of oxygen containing compounds (oxygenates). The total amount of oxygenates in the hydrocarbon component is suitably not more than 0.2 mass %, particularly suitably not more than 0.1 mass %. Oxygenates mean here oxygen containing compounds with the exception of C1-C8 alcohols and tertiary alkyl ethers which may be included in the fuel composition.

The density of the hydrocarbon component is typically 720-775 kg/m³, as measured at 15° C. by the method of EN ISO 12185.

The hydrocarbon component has unique distillation properties. In one embodiment, the initial boiling point is 28° C. 30% by volume of the component is evaporated at 70° C., 50% by volume of the component is evaporated at 100° C., and at least 85% by volume of the component is evaporated at temperatures up to 150° C., as measured by the method of EN ISO 3405. The cut-off temperature (final boiling point) of the hydrocarbon component is 175° C.

The hydrocarbon component has RON of 50-70, suitably 55-70.

According to an embodiment the fuel composition comprises 0.5-14% by volume, suitably 2-10% by volume of butane. Suitably butane is derived from renewable materials.

Optionally said fuel composition may comprise 0.1-2% by volume, suitably 0.1-1% by volume of methanol. Suitably methanol is derived from renewable materials.

Optionally said fuel composition may comprise 0.1-2% by volume of C3-C8 alcohol or alcohols. Suitably isobutanol is used. Suitably said alcohols are derived from renewable materials.

Optionally said fuel composition may comprise 0.1-5.2% by volume, suitably 1-3% by volume of tertiary alkyl ether or tertiary alkyl ethers. Suitably ethyl tert-butyl ether (ETBE) or methyl tert-butyl ether (MTBE) is used. Suitably said ethers are derived from renewable materials.

The fuel composition contains less than 10 mg/kg, suitably less than 5 mg/kg of sulphur, as measured by the method of EN ISO 3405.

The fuel composition contains less than 1 ppm of lead, as measured by the method of EN 237.

The fuel composition contains less than 2% by volume of aromatic compounds, suitably 0.05-1% by volume. Aromatic compounds refer to aromatic hydrocarbons as defined on page 7.

The fuel composition has density of 760-785 kg/m³, as measured at 15° C. by the method of EN ISO 12185.

The fuel composition has vapor pressure of 35-95 kPa, as measured by the method of EN 13016-1. Vapor pressure relates to drivability and startability of the engine when using fuel composition.

At winter conditions "winter grade" of the fuel composition is suitably used, where the content of ethanol is lower, about 70-80% by volume and the combined content of the hydrocarbon component and butane is higher, about 14-30% by volume, to produce vapor pressure necessary for starting the engine at cold temperature, i.e. at temperatures below 0° C. The "winter grade" composition has vapor pressure of 50-95 kPa.

At summer conditions "summer grade" of the fuel composition is suitably used, where the content of ethanol is higher, about 75-86% by volume and the content of the hydrocarbon component and butane lower, about 12-25% by volume. The "summer grade" composition has vapor pressure of 35-70 kPa.

According to one embodiment the fuel composition comprises at least 90% by volume, even at least 95% by volume of components originating from renewable materials, where at least the hydrocarbon component is derived from feedstock comprising tall oil materials, and the ethanol is also obtained from renewable materials.

The combustion of the fuel composition is stable, consistent and clean.

The specific combination of 70-86% by volume of ethanol, blended with 5-20% by volume of the hydrocarbon component comprising hydrocarbons derived from feedstock comprising tall oil material, where said hydrocarbon component has RON of 50-70, and said hydrocarbon component comprises 25-60 mass % of naphthenes, 160°, provides the fuel composition surprisingly good ignition properties without pre-ignition events, as well as excellent idling properties.

Idling properties of a fuel compositions have effect on the stability of combustion. Unfavorable idling properties may result in difficulties maintaining stable combustion during idling, mainly due to low in-cylinder turbulence and high amounts of internal EGR (Exhaust Gas Recirculation). With this in mind, the results from the tests in the examples show a significantly increased combustion stability during idling as indicated by the CoV of IMEP (covariance of induced mean efficient pressure) when running fuel compositions of the invention. It was shown that the release of heat in the combustion space at the measured revolutions was more with the fuel compositions of the invention when compared with commercial E85 fuel.

Even given the measurement spread due to load variance, there is a clear indication that the fuel compositions of the invention have a longer ignition delay and a slower burn when compared with the commercial E85 fuel. This typically contradicts a higher stability. Even though the heat release is theoretically poorer, the fuel is better utilized in the case of the fuel compositions of the invention. It should also be noted that the measurement to measurement spread of the curves representing the fuel composition of the invention and comparative composition (commercial E85 fuel) further supports the conclusion that the fuel compositions of the invention are significantly better for idling stability. Less additives are needed for improving idling properties.

The fuel composition of the invention has octane rating (RON/MON) of at least 95/85, suitably of at least 104/88. Octane rating is related to high load combustion and knocking behavior.

The fuel composition comprising ethanol and a hydrocarbon component comprising hydrocarbons derived from feedstock comprising tall oil material provides several considerable advantages. An improved high ethanol E85 fuel is provided with improved combustion properties, improved combustion stability, improved idling and with high vapor pressure without pre-ignition events.

Further, the emissions are reduced when using the composition fuel composition comprising ethanol and a hydrocarbon component comprising hydrocarbons derived from feedstock comprising tall oil material in engines based on Flexible Fuel Vehicle technology (FFV).

Manufacture of the Hydrocarbon Component Comprising Hydrocarbons Derived Feedstock Comprising Tall Oil Material The hydrocarbon component derived from feedstock comprising tall oil material may be obtained using catalytic hydroprocessing.

Tall oil material is renewable feedstock, which comprises a mixture of plant derived compounds obtained as a by-product from the forest industry, typically from pine and spruce trees. Tall oil material refers to crude tall oil, purified tall oil, tall oil resin acids, tall oil fatty acids (TOFA), tall oil pitch, tall oil neutral substances, pyrolysis oil and any combinations thereof. In one embodiment, the feedstock comprises crude tall oil (CTO), which is derived from the chemical pulping of woods. It is typically composed of a mixture of resin acids, fatty acids, sterols, alcohols, neutral substances, unsaponifiable matter and non-acid materials.

The term "crude tall oil" or "CTO" or "tall oil" refers here to a product which is mainly composed of both saturated and unsaturated oxygen-containing organic compounds such as unsaponifiable matter, sterols, resin acids (mainly abietic acid and its isomers), fatty acids (mainly linoleic acid, oleic acid and linolenic acid), fatty alcohols, sterols and other alkyl hydrocarbon derivatives. The handling and cooking of the wood causes break down of the triglyceride structures and hence CTO does not contain any significant amounts of triglycerides. Typically, CTO contains minor amounts of impurities such as inorganic sulfur compounds, residual metals such as Na, K, Ca and phosphorus. The composition of the CTO varies depending on the specific wood species.

The feedstock may comprise in addition to tall oil material other material or materials originating from renewable sources, such as oils and fats derived from plants, animals including fish, algae, microbiological processes, waste oils and fats, and any combinations thereof.

The feedstock may optionally be purified before it is subjected as liquid feed to catalytic hydroprocessing. Said purification facilitates the performance of the catalytic hydroprocessing. Purification can be accomplished in any appropriate manner, such as by means of washing with washing liquid, filtering, distillation, degumming, depitching, and evaporating. Also, a combination of the above mentioned purification methods can be used.

According to one embodiment the process may comprise a purification stage upstream the catalytic hydroprocessing stage. In this embodiment feedstock is subjected to evaporative treatment whereby purified feedstock is obtained. The content of harmful substances in tall oil material, such as metal ions, sulfur, phosphorus and possible lignin residuals is reduced by the purification and as much as possible of valuable components, such as neutral components of the tall oil are kept in the purified material. Purification of the feedstock also enhances catalyst performance and lifetime. In the purification light components such as crude sulphate turpentine (CST) and heavy components can be removed.

In an embodiment the purification is provided by evaporation using a series of two or more evaporators at elevated temperatures, and reduced pressures may be used.

According to one embodiment the purification is performed by using a heater and evaporator combination. In this embodiment, the feedstock (such as tall oil material or fatty acid material) is first heated up under vacuum. A suitable temperature is 150 to 230° C. at a pressure of 40 to 80 mbar. A gas phase containing light components (such as crude sulfate turpentine originating from tall oil) and water is separated from a liquid phase. The liquid phase is directed to an evaporator for further purification. The evaporator may be any of the evaporators described below, using conditions suggested below.

According to another embodiment the purification is performed by using two or three evaporators in the purification. In this embodiment, the first evaporator is a thin film evaporator. In an embodiment the evaporator operates at a temperature of 150 to 200° C., and a pressure of 10 to 20 mbar. The gas phase and water is separated from the liquid phase.

In the purification embodiment which uses two evaporators, the liquid fraction from the first evaporator is led to a second evaporator. A thin film evaporator or plate molecular still can be used. The second evaporator typically operates at a temperature of 300 to 390° C. and a pressure of 0.01 to 15 mbar. The distillate, i.e. purified material is fed to the reactor system for catalytic treatment.

In the purification embodiment that uses three evaporators, the liquid fraction from the first evaporator is led to a second evaporator, which is a thin film evaporator or a plate molecular still. Typical operating conditions of the second evaporator include evaporation at a temperature of 200 to 280° C. and a pressure of 5 to 10 mbar. The third evaporator is a short path evaporator. It typically operates at a temperature of 280 to 360° C. and a pressure of 0.1 to 5 mbar. From the last evaporator, the distillate, i.e. purified material is fed to the reactor system.

Performing the evaporation in more than one step enables boiling in the evaporation steps following the first step takes place in a more controlled manner because low boiling components do not cause so much migrating of the impurities to the vapor.

Suitably the liquid feedstock, which is optionally purified, is diluted with a hydrocarbon diluent, heated and fed into a hydroprocessing reactor system, where it is subjected to catalytic hydroprocessing on a mixture of catalysts capable of all of these reactions.

Catalytic Hydroprocessing

The optionally purified feedstock is subjected to catalytic hydroprocessing in the presence of hydrogen and catalysts capable of effecting hydroprocessing reactions for providing hydrocarbons.

The hydroprocessing comprises at least one main reaction phase, where the hydroprocessing reactions such as hydrogenation, hydrodeoxygenation, hydrocracking, hydrodearomatization, hydrodewaxing, hydrodenitrification and hydrodesulfurization take place, and additional optional pre-treatment phase upstream the main reaction phase and optional post-treatment phases downstream the main reaction phase.

The process is operated in a reactor system, which comprises at least one catalytically active guard bed phase and at least one catalytically active main reaction phase. The two phases may be physically combined into one unit. At least one of said phases comprises a catalyst bed, wherein hydrodeoxygenating (HDO) and hydrodewaxing (HDW) catalysts are combined with each other.

The main reaction phase may further comprise inert layer(s) and trap layer(s) for distributing the flow and/or trap impurities, in addition to the guard bed(s) and catalyst bed(s).

In one embodiment said catalytic hydroprocessing may be carried out in one stage where hydrodeoxygenation (HDO) and hydrodewaxing (HDW) are carried out in a hydroprocessing reactor system comprising one or more reactors. In the one stage operation, the feedstock flows through the entire hydroprocessing reactor system from inlet to outlet without removal of any intermediate products. The optional guard bed phase(s) and main reaction phase(s) operate in a common reaction atmosphere at substantially the same pressure.

In another embodiment the main reaction phase comprises two or more main catalyst beds with their respective combinations of HDO and HDW catalysts. When the main reaction phase comprises two or more main catalyst beds, these typically operate in series. It is also possible to have main catalyst beds operating in parallel.

The active HDO and HDW catalysts may be combined by being mixed with each other or they may be provided in separate layers or compartments within the same catalyst bed. The mixed catalysts may be provided by physically mixing different catalyst particles. The active catalytic components may also be combined during production of the catalyst, e.g. by being added onto the same support material(s). The catalyst layers may be provided by layering during packing of the bed.

The combination of the catalysts need not be uniform. Thus, a catalyst bed may contain more of the HDO or more of the HDW catalyst(s) in the flow direction. There may be different types of HDO catalysts and/or HDW catalysts in a bed. Similarly, there may be several layers of the various catalysts in a catalyst bed and the layers need not be of equal size. The reactor system typically also comprises catalyst beds with only one type of catalyst, i.e. HDO or HDW. Thus, for instance, the last catalyst bed of the main reaction phase may comprise only HDW catalyst.

In the process the optionally purified feedstock is suitably diluted with a hydrocarbon diluent, heated and fed into a reactor system, where it is subjected to catalytic hydroprocessing on a mixture of catalysts capable of the hydroprocessing reactions.

The diluted feedstock is led to the guard bed phase. There are typically from one or more guard catalyst beds arranged in series or in parallel. The guard beds contain active catalyst material, as described above, for the removal of harmful substances from the feed. Hydrogen gas is fed into the guard phase either separately or premixed with the feed. The guard phase is pressurized and heated in order to provide the desired removal of metals, and phosphorus from the feed.

The reactor system typically comprises at least one catalytically active guard bed phase upstream of the main reaction phase. The purpose of the guard phase is to protect the main phase catalyst(s) from poisoning and fouling. The guard phase also prolongs the active operating time of the main phase catalysts. The guard bed(s) may be combined in the same pressure vessel as the main catalyst beds or they may be provided in separate pressure vessel(s).

At least one of the guard beds contains active catalyst material for the removal of metals, sulphur and phosphor present in the feed. The active catalyst materials are typically selected from Ni, Co, Mo, W, zeolites, $Al_2O_3$, $SiO_2$ and mixtures thereof.

In an embodiment at least one guard bed contains a combination of HDO catalyst and HDW catalyst. When the reactor system comprises two or more guard beds, at least one of the guard catalyst beds typically comprises HDW catalyst combined with HDO catalyst. The catalysts in question may contain the same active components as those described for the main phase above. However, the catalytic activity of the guard bed catalysts is typically lower than that of the main phase catalyst.

In an embodiment the feed material after the guard bed phase passes through the main catalyst beds of the reactor system in series as a continuous flow without outlets for byproducts or other side streams. The main catalyst beds may be provided in one pressure vessel. In an embodiment the catalyst beds are split among several pressure vessels.

In an embodiment HDO and HDW catalysts are combined in two or more catalyst beds of the reactor system. Typically one of said catalyst beds is located in a guard phase and another one is located in a main phase. In a further embodiment at least two main catalyst beds comprise a combination of HDO and HDW catalysts.

The guard beds and/or the main catalyst beds may comprise an inert layer at the inlet ends of the reactors and also between the catalyst beds. The catalysts may also be diluted with appropriate inert mediums. Dilution of the active catalysts serves to even out the exothermic reactions and to facilitate temperature control in the reactor(s). Examples of inert media include glass spheres and silica. In one embodiment at least one of the catalysts is diluted with an inert material.

From the guard phase the feed flow is fed to the main reaction phase. There may be several main catalyst beds operating in series or in parallel in the reactor system. Typically there are one or two main catalyst beds operating in series. In an embodiment the process is designed to operate in such a way that the feed passes through a series of main catalyst beds as a continuous flow without intermediate outlets for by-products or other side streams. The number and size of the reaction vessels can be freely designed to suit the space available, taking into consideration the desired process and flow parameters. Thus, the main reaction phase may comprise one pressure vessel or it may be split into two or more pressure vessels.

The first main catalyst bed in the flow direction typically contains a combination of HDO and HDW catalysts as described above. Additional hydrogen gas may be fed to the main phase to provide sufficient reagent for the various hydroprocessing stages.

Since the catalysts are combined in the catalyst bed(s) hydrogenation, hydrodewaxing, hydrodeoxygenation, hydrodearomatization, hydrodenitrification, hydrodesulphurization and hydrocracking take place simultaneously.

Since most of the reactions are exothermic, the temperature has a tendency to rise. In an embodiment hydrogen is fed into the main reaction phase as quench gas to control the temperature. Quench gas may also be added to one or more of the guard beds to ascertain that the temperature does not rise too high.

From the first catalyst bed in the main reaction phase the flow passes to the second catalyst bed, where the proportion of HDO catalyst is typically lower than in the first catalyst bed. In case there are only two catalyst beds in the reactor system, the second bed will comprise mainly or only HDW catalyst. In case there are several beds, the second bed will comprise also HDO catalyst but in a minor proportion compared to the first bed. Typically the last bed in the main catalyst bed series contains only HDW catalyst. This makes it possible to control the isomerization and to adjust the degree of isomerization and cracking to a suitable level according to the required properties of the hydrocarbon product.

Catalysts

The HDO catalyst can be any HDO catalyst known in the art for the removal of hetero atoms (O, S, N) from organic compounds. Thus said HDO catalyst is capable of hydrodesulfurization and hydrodenitrification in addition to hydrodeoxygenation. In an embodiment the HDO catalyst is selected from a group consisting of catalysts comprising Ni, Mo and/or Co, such as NiMo, CoMo, and mixtures of Ni, Mo and Co. Suitably the HDO catalyst is a supported catalyst and the support can be any oxide. Typically said oxide is selected from $Al_2O_3$, $SiO_2$, $ZrO_2$, zeolites, zeolite-alumina, alumina-silica, alumina-silica-zeolite and activated carbon, and mixtures thereof.

In an embodiment, the catalyst comprises solid particles of $NiMo/Al_2O_3$ or, $NiMo/SiO_2$. In another embodiment the catalyst comprises $CoMo/Al_2O_3$ or $CoMo/SiO_2$. In a further embodiment the catalyst comprises $NiMoCo/Al_2O_3$ or, $NiMoCo/SiO_2$. It is also possible to use a combination of HDO catalysts.

The HDO catalyst(s) is/are sulphided prior to start up. Adequate sulphidation during operation is usually provided by sulphur compounds contained in the feed material.

In an embodiment the HDW catalyst is selected from hydrodewaxing catalysts typically used for isomerising and cracking paraffinic hydrocarbon feeds. Examples of HDW catalysts include catalysts comprising Ni, W, or molecular sieves or combinations thereof. Suitably the HDW catalyst is a catalyst comprising NiW, zeolite with medium or large pore size, or a combination thereof.

A catalyst comprising NiW is a suitable HDW catalyst. NiW has excellent hydrodewaxing and hydrodearomatizing properties and it also has the capacity of performing the hydrodeoxygenation and other hydrogenation reactions of biological feed materials, which are typically performed by HDO catalysts. Catalysts comprising aluminosilicate molecular sieves and especially zeolites with medium or large pore sizes are also useful as HDW catalysts. Typical commercial zeolites that may be used include for instance ZSM-5, ZSM-11, ZSM-12, ZSM 22, ZSM-23 and ZSM 35. Other useful zeolites are zeolite beta and zeolite Y.

The HDW catalyst is suitably supported on an oxide support. The support materials may be the same as or different from those of the HDO catalyst. Typically said oxide is selected from $Al_2O_3$, $SiO_2$, $ZrO_2$, zeolites, zeolite-alumina, alumina-silica, alumina-silica-zeolite and activated carbon, and mixtures thereof.

In an embodiment the HDW catalyst is selected from $NiW/Al_2O_3$ and $NiW/zeolite/Al_2O_3$. These HDW catalysts are especially well suited for combining with the HDO catalyst since they also require sulphidation for proper catalytic activity.

In a specific embodiment, a catalyst bed of the main reaction phase of the hydroprocessing reactor system comprises a combination of sulfided HDO and HDW catalysts, wherein the HDO catalyst is $NiMo/Al_2O_3$ and the HDW catalyst is $NiW/zeolite/Al_2O_3$. The $NiMo/Al_2O_3$ catalyst mainly serves the purpose of hydrogenation, hydrodeoxygenation, hydrodesulfurization and hydrodenitrification. The $NiW/zeolite/Al_2O_3$ catalyst mainly serves the purpose of hydrodewaxing, hydrogenation, hydrodearomatizing, and hydrocracking. However, as mentioned above, NiW has the capacity also for some hydrodeoxygenation, hydrodesulfurization and hydrodenitrification of the feedstock.

In an embodiment the HDW catalyst is mixed with the HDO catalyst in the first catalyst bed at the inlet end of the reactor system where the feed enters the main reaction phase. In case there are two or more catalyst beds in the main phase, the HDO and HDW catalysts are typically mixed in at least two of the main catalyst beds of the reactor system.

The proportion of HDO catalyst at the inlet end of the main reaction phase is typically higher than the proportion of HDW catalyst. In an embodiment the proportion of the HDW catalyst grows towards the outlet end of the reactor system. The last catalyst bed in the main reaction phase typically comprises only of HDW catalyst.

The proportion of HDO and HDW catalysts in the catalyst combination may vary depending on the feed material and the amount of hetero atoms, aromatic compounds and other impurities therein. The proportion of NiW and zeolite in the NiW/zeolite catalyst may also vary. As a general rule, NiW is the most abundant of the active catalysts in the reactor system. Suitable catalyst compositions are selected based on the knowledge of the feed, the reaction parameters and the desired distillate specification(s). For instance, a feed having a high amount of aromatics will require a relatively higher amount of HDW catalyst for cracking than is necessary for a feed with a low amount of aromatics.

In an embodiment the reactor system contains one main reaction phase. The main reaction phase comprises one or more catalyst beds. The first catalyst bed calculated in the flow direction of the main phase contains a combination of 50, 60, 70, 80, 90 or 95% by weight HDO catalyst and 5, 10, 20, 30, 40 or 50% by weight HDW catalyst. The last catalyst bed of the main phase contains 100% by weight HDW catalyst. In an embodiment there is a middle catalyst bed which contains 5, 10, 20, 30 or 50% by weight HDO catalyst and 50, 60, 70, 80, 90 or 95% by weight HDW catalyst.

In a specific embodiment the reactor system comprises a main phase with several catalyst beds operating in series. In an embodiment the first catalyst bed comprises 75 to 95% by weight NiMo/Al$_2$O$_3$ or CoMo/Al$_2$O$_3$ catalyst and 5 to 25% by weight NiW/zeolite/Al$_2$O$_3$ catalyst. The second catalyst bed comprises 2 to 15% by weight NiMo/Al$_2$O$_3$ or CoMo/Al$_2$O$_3$ catalyst and 85 to 98% by weight NiW/zeolite/Al$_2$O$_3$ catalyst. The third and fourth catalyst beds both comprise 100% NiW/Al$_2$O$_3$ or NiW/zeolite/Al$_2$O$_3$ catalyst.

It is characteristic of the HDO and HDW catalysts used in the hydroprocessing that sulphur has to be present to maintain the catalytic activity of the catalysts. The zeolite in the HDW catalyst is not sensitive to poisoning by low levels of sulphur. The catalysts are typically sulphided before start up by a sulphur containing compound such as hydrogen sulphide or dimethyl disulphide. Additional sulphur during operation is needed only in case the concentration of organic sulphur in the feed material is too low. When additional sulphur is needed, is suitable sulphur compound may be added to the feed.

The additional sulphur can be fed to the hydroprocessing stage together with the feed or it can be fed separately to the hydroprocessing stage. Additional sulphur can be supplied to the process in gaseous form like hydrogen sulphide, or it can be any material that produces hydrogen sulphide in the process, like organic sulphur compounds, such as dimethyl disulphide. The amount of additional sulphur depends on the amount of sulphur contained in the feed. A person skilled in the art is able to determine the amount of needed sulphur without undue burden. Generally, the sulphur content in the feed is suitably maintained at the level of 200-300 ppm, calculated as elemental sulphur.

Hydroprocessing Conditions

The hydroprocessing is carried out under a pressure of 10-250 bar, preferably 80-110 bar.

The hydroprocessing is carried out at a temperature in the range of 270° C. to 450° C., suitably at 290° C. to 410° C.

The hydroprocessing feed rate WHSV (weight hourly spatial velocity) of the feedstock is proportional to an amount of the catalyst. The WHSV of the feed material in the hydroprocessing varies between 0.1 and 5, and it is preferably in the range of 0.3-0.7.

The ratio of H$_2$/feedstock in the hydroprocessing depends on the feedstock and varies between 600 and 4000 Nl/l, suitably of 1300-2200 Nl/l.

The feedstock is pumped to the hydroprocessing reactor at a desired speed. Feed rate LHSV (liquid hourly space velocity) of the feedstock is typically in the range of 0.01-10 h$^{-1}$, suitably 0.1-5 h$^{-1}$.

According to one embodiment the hydroprocessing is carried out in one stage, where the molecular structure of the feedstock is modified suitable for fuel use and sulfur (S), nitrogen (N) and oxygen (O) are removed from the molecules. In parallel with the reaction of S, N, and O with hydrogen, the molecules are cracked and isomerized to provide hydrocarbons suitable for fuel use. It is to be noted that the catalyst beds for the treatment may necessary not be packed in a single reactor but they can also be placed in separate reactors arranged in series.

The hydroprocessing reactions are highly exothermic reactions in which the temperature can rise to a level which is detrimental to the stability of the catalyst and/or product quality. In some cases, it may be necessary to control the temperature variations particularly in the catalyst beds. Recirculation of the hydrocarbon product stream and effluent gas provide an efficient means for constraining the exothermic reaction whereby the recycled liquid and gas streams act as media for lowering the temperature of the catalyst beds in a controlled manner.

Additionally the hydrocarbon product may be directed for quench purposes between one or more catalyst beds. Further, between the active catalyst beds there may be provided space for the introduction of cooling quench gas. Quench gas may also be introduced into the active bed(s).

In an embodiment the light hydrocarbons and/or gaseous fractions separated at one or more locations of the process are directed to an amine scrubber, which removes H$_2$S and CO$_2$ from the gaseous products. The scrubbed gases, comprising mainly hydrogen and some impurities, may be recycled to the process as feed hydrogen and quench gas.

The product from the hydroprocessing reactor system is drawn off from the bottom of the reactor system. In one embodiment the product is cooled and directed to a separator, such as any suitable separator or flashing unit. In the separator, water, the light component comprising hydrogen, light hydrocarbons (C1-C5 hydrocarbons), H$_2$S, CO and CO$_2$ are separated from the heavy component comprising >C5 hydrocarbons and some C1-C5 hydrocarbons. Water and gases may also be separated by other means which are well known to those skilled in the art.

The treatment of the feedstock with hydrogen, i.e. the hydroprocessing provides a mixture of gaseous and liquid hydrocarbons, water and some mostly gaseous by-products such as H$_2$S, CO and CO$_2$. The main hydroprocessing products are paraffinic higher (>C5) hydrocarbons.

In the hydroprocessing long carbon chains of the fatty acids are isomerized. Olefins and aromatic compounds are hydrogenated and fused ring systems are broken. This reduces the complexity of the compounds and improves the quality of the product. Cracking of large molecules, side chains and of some of the long chains occurs, results in an increase of smaller useful molecules but also causes an increase in light gas products (methane, ethane, propane and butane). The liquid reaction products, i.e. the mixture of higher (>C5) hydrocarbons is subjected to separation, suitably using fractionation, whereby a fraction boiling in the range of 80-120° C. is recovered. A diesel fraction and a heavy fraction are typically also produced and they may be recovered or recirculated to the inlet end of the reactor system.

A person skilled in the art is able to vary the distilling conditions and to change the temperature cut point as desired to obtain any suitable hydrocarbon product.

The process can be realized in any typical apparatus for producing biofuel or biofuel components, which includes the specific catalyst bed(s) described above. An apparatus adapted for realizing an embodiment of the process comprises a catalytically active guard phase and main reaction phase. At least one of said phases comprises a catalyst bed, in which HDO and HDW catalysts are combined with each other. In an embodiment, the catalysts are mixed with each other either by physical mixing of catalyst particles or by providing both types of catalysts on the same support material.

EXAMPLES

The following example is an illustrative of embodiments of the present invention, as described above, and it is not meant to limit the invention in any way. The invention is illustrated also with reference to the figures.

Example 1

E85 Fuel Composition

Two E85 fuel compositions were produced from a hydrocarbon component and ethanol. 10.5% by volume of the hydrocarbon component was blended with 82% by volume of ethanol and 7.5% by volume of butane to obtain summer grade E85 fuel (blend E); and winter grade E85 fuel was manufactured in a similar manner with 14.5% by volume of the hydrocarbon component, 74.5% by volume of ethanol and 11.5% by volume of butane (blend F). ETBE and iso-butanol were used as additives in both compositions within the specified limits.

The hydrocarbon component was obtained by catalytic hydroprocessing of crude tall oil, said hydrocarbon component having RON of 65, and comprising 25-60 mass % of naphthenes. The distillation properties of the hydrocarbon component were as follows: 30% by volume of the component was evaporated at 70° C., 50% by volume of the component was evaporated at 100° C., and at least 85% by volume of the component was evaporated at temperatures up to 150° C., as measured by the method of EN ISO 3405.

Commercial summer grade E85 fuel containing 81.7% by volume of ethanol and crude oil naphtha with additives (ETBE and iso-butanol) was used for comparison (reference blend D).

The compositions of the blends are presented in table 1 below. Blends E and D (reference) were both summer grade products. Blend F was winter grade product, thus it could not directly be compared with blend D. However, the test results show that also blend F is highly suitable as E85 fuel. From table 1 it can be seen that the DVPE (dry vapor pressure equivalent) of blend F is higher because of the requirements for winter grade E85. The adjusting of DVPE is achieved by adjusting the amount of the hydrocarbon component.

Further, the C, H and O amounts and their differences in table 1 indicate that the chemical structure of components contained in the blends are different, thus the hydrocarbon ratios differ and also the heating values are different.

TABLE 1

| | Blend D, Reference E85 Summer | Blend E-10.5% UPM-Naphtha Summer | Blend F, 14.5% UPM-Naphtha Winter |
|---|---|---|---|
| Density at 15° C. [kg/l] | 0.7799 | 0.7786 | 0.7692 |
| Iso-butanol [vol %] | 0.33 | 0.48 | 0.48 |
| UPM Naphtha [vol %] | 0 | 10.5 | 14.5 |
| HC content [vol %] | 15.48 | 15.4 | 21.42 |
| Sulphur mg/kg | <3 | <3 | <3 |
| Ethanol [vol %] | 81.7 | 82 | 75 |
| MTBE [vol %] | 0 | 0 | 0 |
| ETBE [vol %] | 2.52 | 2.1 | 2.1 |
| RON (corr) | 107.3 | 106.3 | 106.5 |
| MON (corr) | 89.1 | 88.5 | 88.7 |
| Methanol [vol %] | 0 | 0 | 0 |
| DVPE [kPa] | 60.9 | 55.6 | 87.2 |
| C [mass-%] | 58.0 | 57.6 | 59.8 |
| H [mass-%] | 13.1 | 13.4 | 13.7 |
| O [mass-%] | 28.9 | 28.9 | 26.5 |
| LHV [MJ/kg] | 29.5 | 29.4 | 30.7 |
| *C | 1 | 1 | 1 |
| *H | 2.7 | 2.8 | 2.7 |
| *O | 0. | 0.4 | 0.3 |

HC = Hydrocarbon
MTBE = Methyl tert-butyl ether
ETBE = Ethyl tert-butyl ether
DVPE = Dry Vapor Pressure Equivalent
LHV = Lower Heating Value
*Calculated form the proportions of C, H and O%.

The blends E, F and D (reference) were tested in Part Load Test, Lean Excursion Test, Idling Test, and Pre-Ignition Test.

Test Set-Up

A single cylinder research engine based on the latest SAAB Ecotec engine was used, having the following engine specification:
  86.0 mm bore
  94.6 mm stroke
  0.55 l engine displacement
  9.2:1 compression ratio
  fuel direct injection using standard injector
  Mobil 1 SAE 0W-40 engine oil Test Cell Instrumentation:

Cylinder pressure measurement: Uncooled 7 mm AVL GU21D is used. The sensor is mounted flush with the roof of the combustion chamber and is positioned close to the cylinder liner to ensure that pressure oscillations due to knocking are detected accurately.

For fuel measurements a Promass 80 coriolis flow meter is used.

A Horiba MEXA 9100 exhaust gas analyzer is used for the determination of the emission levels from the engine. Lambda value is calculated using the Brettschneider equation.

An AVL 415S smoke meter is used in order to determine engine soot levels in the exhaust gas flow.

Pressure and temperature sensors are used in various ranges. All measurement modules used for these tests have been calibrated using equipment with traceability towards national standards.

Part Load Test

Part Load testing was performed in order to evaluate the combustion rate and fuel consumption. Emissions and fuel consumption data, in addition to the cylinder pressure indicating data give substantial insight about the combustion.

The following operating points for part load conditions were used. These comply with operating points derived from the New European Driving Cycle (NEDC), which simulates average driving of a vehicle in Europe:
  1500 rpm/4.00 bar IMEP (Common single cylinder operating point)
  2000 rpm/2.00 bar BMEP (Common multi cylinder operating point)
  IMEP=Indicated Mean Effective Pressure,
  BMEP=Brake Mean Efficient Pressure In tables 2 and 3, emission results and combustion data are shown.

These tests illustrate different driving events and show the effect of change of fuel. The emissions provide information on the operation of the engine and of burning; the emission results of table 2 indicate improvements obtained with the fuel compositions comprising ethanol and a hydrocarbon component comprising hydrocarbons derived from feedstock comprising tall oil material, when compared with the reference E85 fuel.

The fuel consumption is lower with the fuel compositions comprising ethanol and a hydrocarbon component comprising hydrocarbons derived from feedstock comprising tall oil material, efficiency is higher and co-variance is smaller when compared with the commercial E85 fuel, all these data indicating improvements in view of commercial E85 fuel.

Lean Excursion Test

The lean excursion test was performed to judge the combustion stability (in this case presented as covariance [CoV] of IMEP) as a function of lambda, shown in FIG. 1, where the air/fuel ratio was varied. In this case the running conditions originated from the 2000 rpm 2 bar BMEP operating point.

Emissions and combustion data of blends D, E and F, for 2000 rpm 2 bar BMEP, from λ=1 to λ=1.45 are shown in table 4.

From FIG. 1 it can be seen that that blend E and the reference fuel D provide similar performance, however the emissions and fuel consumption are smaller with blend E.

From FIG. 1 it can also be seen how the change of engine λ value effects the engine performance and fuel combustion behavior. The CoV IMEP values at λ=1.45 are significantly higher than the ones at λ=1. FIG. 1 shows the effect of varying the air/fuel ratio on the heat liberated in the combustion.

The test data shows that there are no significant differences in the combustion stability of the fuel compositions comprising ethanol and a hydrocarbon component comprising hydrocarbons derived from feedstock comprising tall oil material within the relevant range.

Idling Test

Idling represents one of the harshest running conditions in an engine with high amounts of internal Exhaust Gas Recirculation [EGR], low in-cylinder motion and in most cases poor fuel preparation. The outcome of idling tests indicates fuel ignitability and influence on ignition delay as well as combustion stability during idling.

The engine speed of 800 rpm was used for the idling operating point: 800 rpm/1.00 bar IMEP*.

*) Typically idling is defined as the load at which the engine delivers no brake torque (BMEP=0). However, due to slightly low friction losses at lower engine speeds for the single cylinder dyno, BMEP is not set to 0 for the idling operating point.

Figure 2:
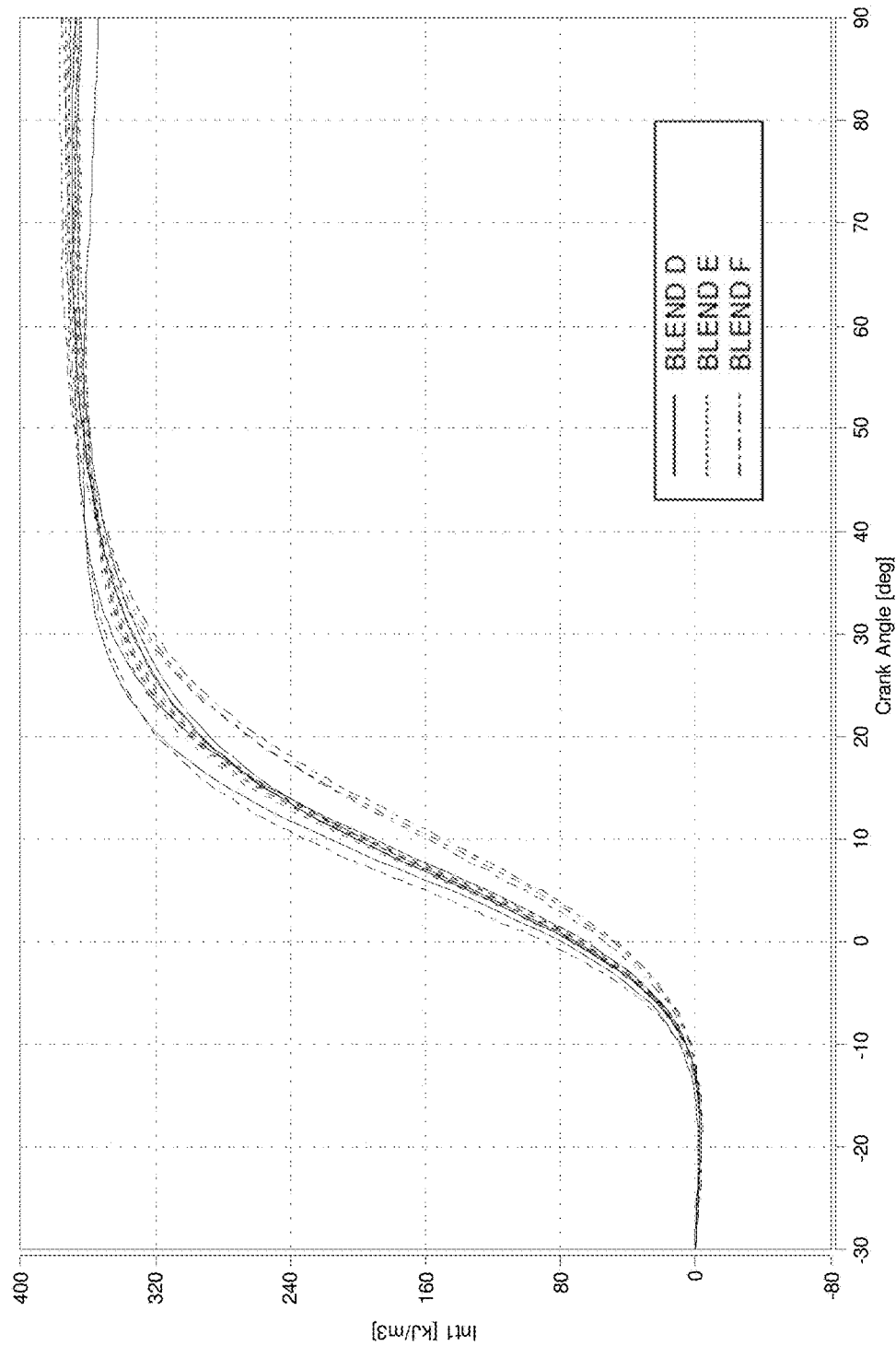
FIG. 2 shows idling test results graphically.

The results for blend D, blend E and blend F are shown in table 5 and graphically in FIG. 2.

The idling test data shows that the fuel compositions comprising ethanol and a hydrocarbon component comprising hydrocarbons derived from feedstock comprising tall oil material are significantly better than the reference fuels in terms of idling stability. Further, less additives are needed for improving idling properties.

Pre-Ignition Test—Irregular Combustion

Normal combustion is understood as combustion where the fuel is consumed through a flame front initiated by, and originating from the spark plug.

Knocking combustion is understood as combustion that is initiated by the spark, but before the flame front has consumed all fuel the pressure/temperature/time is right for some unconsumed fuel to self-ignite. The pressure waves from the multiple combustions gives rise to strong pressure fluctuations.

Pre-ignition means any combustion that starts before spark and results in uncontrolled combustion.

Extreme Pressure cycles mean combustion leading to extreme cylinder pressures and knock—caused by pre-ignition.

All pre-ignition events do not lead to extreme pressure cycles but all pre-ignition events have the potential to lead to extreme pressure cycles.

Based on earlier experience there was a risk of pre-ignition even when running the highly knock resistant E85 fuel.

The test compositions were run in the AVL stochastic Pre-Ignition test cycle. A total of 225 000 combustion cycles have been run with the test E85 fuel blends E and F without a single pre-ignition event. Consequently, no difference between the commercial E85 fuel and the two fuel compositions comprising ethanol and a hydrocarbon component comprising hydrocarbons derived from feedstock comprising tall oil material could be detected.

As a conclusions it can be seen that the combustion properties are the same or better for the fuel compositions comprising ethanol and a hydrocarbon component comprising hydrocarbons derived from feedstock comprising tall oil material, and the fuel consumption and efficiency is the same or better for the fuel compositions. The raw emissions measured are virtually at least the same as for the commercial E85 fuel. This indicates that the engine operates well in an optimum manner, which also increases the lifetime of the engine. Increased raw emissions usually mean irregularities in engine operation. Further, no pre-ignition events could be detected for the tested compositions E and F. Also the idling tests show that the idling stability of the fuel compositions comprising ethanol and a hydrocarbon component comprising hydrocarbons derived from feedstock comprising tall oil material is better than the commercial E85 fuel. The use of fuel compositions comprising ethanol and a hydrocarbon component comprising hydrocarbons derived from feedstock comprising tall oil material in current engines designed for ethanol based fuels causes no adverse events or changes in engine operation, and it provides several advantages when compared to commercial E85 fuel.

TABLE 2

1500 rpm 4 bar IMEP

| | Load | Emissions | | | | | | Fuel consumption | | Efficiency | | 10% | 50% | 10-90% |
|---|---|---|---|---|---|---|---|---|---|---|---|---|---|---|
| | | | | | | | | | | | | Combustion data | | |
| | IMEP [bar] | Lambda [—] | $CO_2$ [%] | CO [%] | HC [ppmC1] | $NO_x$ [ppm] | $O_2$ [%] | BSFC [g/kWh] | ISFC [g/kWh] | BTE [%] | LHV [MJ/kg] | MFB [° C.A] | MFB [° C.A] | MFB [° C.A] |
| Blend D | 4.00 | 1.000 | 14.19 | 0.685 | 451 | 1822 | 0.45 | 443.0 | 373.6 | 27.6 | 29.470 | −0.72 | 7.29 | 38.7 |
| Blend E | 4.00 | 1.000 | 14.12 | 0.678 | 401 | 1832 | 0.45 | 439.1 | 370.9 | 27.9 | 29.359 | −0.78 | 7.18 | 39.4 |
| Blend F | 3.99 | 1.000 | 13.85 | 0.888 | 542 | 1772 | 0.63 | 439.0 | 367.0 | 26.7 | 30.688 | −1.03 | 6.82 | 33.0 |

TABLE 3

2000 rpm 2 bar BMEP

|  | Load | Emissions | | | | | | FC | Efficiency | | Combustion data | | | |
|---|---|---|---|---|---|---|---|---|---|---|---|---|---|---|
|  |  |  |  |  |  |  |  |  |  |  | 10% | 50% | 10-90% | CoV |
|  | BMEP [bar] | Lambda [—] | $CO_2$ [%] | CO [%] | HC [ppmC1] | NOx [ppm] | $O_2$ [%] | ISFC [g/kWh] | BTE [%] | LHV [MJ/kg] | MFB [° C.A] | MFB [° C.A] | MFB [° C.A] | IMEP [%] |
| Blend D | 2.01 | 1.002 | 14.16 | 0.66 | 339 | 1170 | 0.49 | 405.8 | 22.3 | 29.470 | −1.54 | 8.04 | 42.47 | 1.51 |
| Blend E | 2.00 | 1.002 | 14.16 | 0.66 | 276 | 1179 | 0.48 | 407.0 | 22.6 | 29.359 | −1.51 | 8.02 | 43.97 | 1.44 |
| Blend F | 2.00 | 1.001 | 13.75 | 0.99 | 463 | 1207 | 0.73 | 399.3 | 21.4 | 30.688 | −1.76 | 7.52 | 39.00 | 1.73 |

HC=Hydrocarbons
BSFC=Brake Special Fuel Consumption
ISFC=Indicated Special Fuel Consumption
BTE=Brake Thermal Efficiency
LHV=Lower Heating Value
MFB=Mass Fraction Burnt
CA=Crank Angle
FC=Fuel consumption

TABLE 4

Lean Excursion

|  | Load | Emissions | | | | | | FC | Efficiency | | Combustion data | | | |
|---|---|---|---|---|---|---|---|---|---|---|---|---|---|---|
|  |  |  |  |  |  |  |  |  |  |  | 10% | 50% | 10-90% | CoV |
|  | BMEP [bar] | Lambda [—] | $CO_2$ [%] | CO [%] | HC [ppmC1] | NOx [ppm] | $O_2$ [%] | ISFC [g/kWh] | BTE [%] | LHV [MJ/kg] | MFB [° C.A] | MFB [° C.A] | MFB [° C.A] | IMEP [%] |
| $\lambda = 1$ | | | | | | | | | | | | | | |
| Blend D | 2.01 | 1.002 | 14.16 | 0.66 | 339 | 1170 | 0.49 | 405.8 | 22.3 | 29.470 | −1.54 | 8.04 | 42.47 | 1.51 |
| Blend E | 2.00 | 1.002 | 14.16 | 0.66 | 276 | 1179 | 0.48 | 407.0 | 22.6 | 29.359 | −1.51 | 8.02 | 43.97 | 1.44 |
| Blend F | 2.00 | 1.001 | 13.75 | 0.99 | 463 | 1207 | 0.73 | 399.3 | 21.4 | 30.688 | −1.76 | 7.52 | 39.00 | 1.73 |
| $\lambda = 1.1$ | | | | | | | | | | | | | | |
| Blend D | 2.00 | 1.101 | 13.30 | 0.13 | 247 | 1231 | 2.08 | 389.0 | 23.4 | 29.470 | −2.35 | 7.61 | 42.32 | 1.59 |
| Blend E | 2.01 | 1.099 | 13.27 | 0.14 | 205 | 1257 | 2.07 | 389.2 | 23.6 | 29.359 | −2.25 | 7.67 | 43.50 | 1.42 |
| Blend F | 2.02 | 1.100 | 13.13 | 0.16 | 342 | 1476 | 2.11 | 378.1 | 22.7 | 30.688 | −3.02 | 6.52 | 39.92 | 1.82 |
| $\lambda = 1.2$ | | | | | | | | | | | | | | |
| Blend D | 2.00 | 1.201 | 12.13 | 0.11 | 259 | 826 | 3.73 | 380.8 | 24.0 | 29.470 | −3.12 | 7.48 | 41.14 | 1.78 |
| Blend E | 2.02 | 1.201 | 12.01 | 0.11 | 238 | 767 | 3.74 | 380.2 | 24.3 | 29.359 | −2.82 | 7.72 | 41.79 | 1.60 |
| Blend F | 2.00 | 1.199 | 12.00 | 0.12 | 333 | 1168 | 3.74 | 370.0 | 23.2 | 30.688 | −3.89 | 6.12 | 38.87 | 2.12 |
| $\lambda = 1.3$ | | | | | | | | | | | | | | |
| Blend D | 2.00 | 1.300 | 11.36 | 0.10 | 298 | 448 | 5.21 | 376.8 | 24.3 | 29.470 | −3.86 | 7.24 | 41.55 | 1.98 |
| Blend E | 1.98 | 1.298 | 11.02 | 0.10 | 286 | 286 | 5.10 | 376.9 | 24.5 | 29.359 | −2.44 | 9.05 | 40.95 | 2.49 |
| Blend F | 1.99 | 1.303 | 11.23 | 0.10 | 351 | 833 | 5.30 | 365.8 | 23.5 | 30.688 | −4.39 | 6.16 | 38.36 | 2.29 |
| $\lambda = 1.35$ | | | | | | | | | | | | | | |
| Blend D | 2.00 | 1.353 | 10.95 | 0.09 | 325 | 366 | 5.89 | 373.0 | 24.4 | 29.470 | −4.01 | 7.44 | 41.68 | 2.56 |
| Blend E | 1.98 | 1.349 | 10.83 | 0.10 | 293 | 300 | 5.85 | 374.7 | 24.4 | 29.359 | −3.54 | 7.90 | 42.27 | 3.31 |
| Blend F | 2.02 | 1.354 | 10.80 | 0.10 | 364 | 725 | 5.94 | 362.3 | 23.9 | 30.688 | −5.47 | 5.35 | 39.28 | 2.68 |
| $\lambda = 1.4$ | | | | | | | | | | | | | | |
| Blend D | 2.00 | 1.402 | 10.55 | 0.08 | 336 | 226 | 6.46 | 374.4 | 24.5 | 29.470 | −4.20 | 7.77 | 42.84 | 4.81 |
| Blend E | 2.00 | 1.398 | 10.43 | 0.09 | 339 | 188 | 6.43 | 373.2 | 24.6 | 29.359 | −3.892 | 8.09 | 42.87 | 4.39 |
| Blend F | 2.01 | 1.403 | 10.41 | 0.09 | 382 | 588 | 6.53 | 360.9 | 23.9 | 30.688 | −6.06 | 5.16 | 40.47 | 3.29 |
| $\lambda = 1.45$ | | | | | | | | | | | | | | |
| Blend D | 2.01 | 1.452 | 10.20 | 0.07 | 401 | 217 | 7.01 | 374.3 | 24.4 | 29.470 | −5.08 | 7.21 | 43.79 | 10.56 |
| Blend E | 2.00 | 1.453 | 10.02 | 0.08 | 423 | 141 | 7.03 | 374.2 | 24.6 | 29.359 | −4.48 | 7.96 | 44.13 | 10.12 |
| Blend F | 2.00 | 1.453 | 10.05 | 0.09 | 427 | 472 | 7.08 | 359.3 | 23.8 | 30.688 | −6.38 | 5.27 | 40.94 | 5.11 |

TABLE 5

| | Load | | Emissions | | | | | FC | Efficiency | | Combustion data | | | |
|---|---|---|---|---|---|---|---|---|---|---|---|---|---|---|
| | | | | | | | | | | | 10% | 50% | 10-90% | CoV |
| | IMEP [bar] | Lambda [—] | CO2 [%] | CO [%] | HC [ppmC1] | NOx [ppm] | O2 [%] | ISFC [g/kWh] | BTE [%] | LHV [MJ/kg] | MFB [° C.A] | MFB [° C.A] | MFB [° C.A] | IMEP [%] |
| Blend D | 1.00 | 1.002 | 13.69 | 1.01 | 1724 | 37 | 1.00 | 627.8 | 12.1 | 29.470 | −2.29 | 9.92 | 30.95 | 16.84 |
| Blend E | 1.01 | 1.005 | 13.72 | 0.88 | 1479 | 29 | 0.95 | 625.3 | 12.6 | 29.359 | −1.61 | 10.73 | 33.44 | 10.94 |
| Blend F | 1.00 | 0.999 | 13.26 | 1.34 | 1495 | 27 | 1.15 | 639.9 | 11.2 | 30.688 | −1.37 | 12.47 | 35.62 | 6.30 |

We claim:

1. A fuel composition comprising a) 70-86% by volume of ethanol and b) 5-20% by volume of a hydrocarbon component comprising hydrocarbons derived from feedstock comprising tall oil material, where said hydrocarbon component has RON of 50-70 and said hydrocarbon component comprises 25-60 mass % of naphthenes.

2. The fuel composition according to claim 1, wherein 30% by volume of the hydrocarbon component is evaporated at 70° C., 50% by volume of the component is evaporated at 100° C., and at least 85% by volume of the component is evaporated at temperatures up to 150° C., as measured by the method of EN ISO 3405.

3. The fuel composition according to claim 1, wherein the hydrocarbon component has RON of 55-70.

4. The fuel composition according to claim 1, wherein the hydrocarbon component comprises 8-30 mass % of $C_{4-12}$ linear alkanes, preferably 10-20 mass % of $C_{4-12}$ linear alkanes.

5. The fuel composition according to claim 1, wherein the hydrocarbon component comprises 5-50 mass % of $C_{4-12}$ branched alkanes, preferably 20-40 mass % $C_{4-12}$ branched alkanes.

6. The fuel composition according to claim 1, wherein the hydrocarbon component comprises 30-50 mass % of naphthenes, preferably 35-45 mass % of naphthenes.

7. The fuel composition according to claim 1, wherein the hydrocarbon component comprises 0.1-25 mass % of $C_{6-12}$ aromatic hydrocarbons, preferably 0.1-10 mass % of $C_{6-12}$ aromatic hydrocarbons.

8. The fuel composition according to claim 1, wherein the hydrocarbon component comprises no more than 1 mass % of alkenes.

9. The fuel composition according to claim 1, wherein the hydrocarbon component comprises no more than 0.5 mass % in total of oxygen containing compounds, preferably no more than 0.2 mass % of oxygen containing compounds.

10. The fuel composition according to claim 1, wherein said composition comprises 0.5-14% by volume, preferably 2-10% by volume of butane.

11. The fuel composition according to claim 1, wherein said composition comprises 0.1-2% by volume of methanol, preferably 0.1-1% by volume of methanol.

12. The fuel composition according to claim 1, wherein said composition comprises 0.1-2% by volume of C3-C8 alcohol or alcohols.

13. The fuel composition according to claim 1, wherein said composition comprises 0.1-5.2% by volume of tertiary alkyl ether or ethers.

14. The fuel composition according to claim 1, wherein said composition comprises less than 10 mg/kg of sulphur, preferably less than 5 mg/kg of sulphur.

15. The fuel composition according to claim 1, wherein said composition comprises less than 1 ppm of lead.

16. The fuel composition according to claim 1, wherein said composition comprises less than 2% by volume of aromatic compounds, preferably 0.05-1% by volume of aromatic compounds.

17. The fuel composition according to claim 1, wherein said composition has vapor pressure of 35-95 kPa.

18. The fuel composition according to claim 1, wherein said composition has vapor pressure of 50-95 kPa.

19. The fuel composition according to claim 1, wherein said composition has vapor pressure of 35-70 kPa.

20. The fuel composition according to claim 1, wherein said composition has RON/MON of at least 95/85, preferably of at least 104/88.

21. The fuel composition according to claim 1, wherein said composition complies with E85 international standard.

22. A fuel composition comprising a) 70-86% by volume of ethanol and b) 5-20% by volume of a hydrocarbon component comprising hydrocarbons derived from feedstock comprising tall oil material, where said hydrocarbon component has RON of 50-70 and said hydrocarbon component comprises 25-60 mass % of naphthenes, and where the hydrocarbon component is obtainable by a method comprising the step of hydroprocessing feedstock comprising tall oil material in the presence of at least one hydroprocessing catalyst and fractionating the hydroprocessed product.

23. The fuel composition according to claim 22, wherein the feedstock comprising tall oil material is selected from crude tall oil, purified tall oil, tall oil resin acids, tall oil fatty acids, tall oil pitch, tall oil neutral substances, pyrolysis oil and any combinations thereof.

24. The fuel composition according to claim 22, wherein the feedstock comprising tall oil material is purified before it is subjected to catalytic hydroprocessing.

25. The fuel composition according to claim 22, wherein the purification comprises evaporation treatment carried out in one, two or three evaporation steps.

26. The fuel composition according to claim 22, wherein the feedstock comprising tall oil material is fed to a catalytic hydroprocessing, which comprises a catalytically active guard bed phase and a main reaction phase comprising a combination of a HDO catalyst and HDW catalyst, the feedstock is treated with hydrogen in the reactor system to obtain a hydroprocessed product.

27. The fuel composition according to claim 26, wherein the HDO catalyst is a catalyst comprising Ni, Mo and/or Co, or a mixture of Ni, Mo and Co.

28. The fuel composition according to claim 26, wherein the HDW catalyst is a catalyst comprising NiW, or zeolite with medium or large pore sizes, or a combination thereof.

29. The fuel composition according to claim 22, wherein the feedstock comprises in addition to tall oil materials other oils and fats derived from plants, animals including fish, algae, microbiological processes, waste oils and fats, and any combinations thereof.

30. A method for the manufacture of a fuel composition, said method comprising the steps of blending 70-86% by volume of ethanol, and 5-20% by volume of a hydrocarbon component comprising hydrocarbons derived from feedstock comprising tall oil material where said hydrocarbon component has RON of 50-70, and it comprises 25-60 mass % of naphthenes.

* * * * *